US006531187B2

(12) United States Patent
Akedo

(10) Patent No.: US 6,531,187 B2
(45) Date of Patent: *Mar. 11, 2003

(54) METHOD OF FORMING A SHAPED BODY OF BRITTLE ULTRA FINE PARTICLES WITH MECHANICAL IMPACT FORCE AND WITHOUT HEATING

(75) Inventor: Jun Akedo, Tsukuba (JP)

(73) Assignee: Agency of Industrial Science and Technology, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/538,332

(22) Filed: Mar. 29, 2000

(65) Prior Publication Data
US 2002/0071905 A1 Jun. 13, 2002

(30) Foreign Application Priority Data

Apr. 23, 1999 (JP) ............................. 11-117328

(51) Int. Cl.⁷ .............................. B05D 1/06; B05D 3/12
(52) U.S. Cl. ...................... 427/475; 427/190; 427/193; 427/194; 427/359; 427/368; 427/369; 427/560
(58) Field of Search ................................ 427/180, 190, 427/191, 193, 194, 475, 359, 368, 369, 560; 264/430, 434, 112, 113, 121

(56) References Cited

U.S. PATENT DOCUMENTS

| 3,100,724 A | * | 8/1963 | Rocheville |
| 4,172,558 A | * | 10/1979 | Zverev et al. |
| 4,801,411 A | * | 1/1989 | Wellinghoff et al. |
| 5,120,366 A | * | 6/1992 | Harada et al. |
| 5,795,626 A | * | 8/1998 | Gabel et al. |
| 5,928,719 A | * | 7/1999 | Mishima et al. |

FOREIGN PATENT DOCUMENTS

| JP | 2-133377 | * | 5/1990 |
| JP | 3-231096 | * | 10/1991 |

OTHER PUBLICATIONS

"Modern Ceramic Engineering: Properties, Processing, and Use in Design" David W. Richerson, pp. 156–167, 1984.*

* cited by examiner

Primary Examiner—Fred J. Parker
(74) Attorney, Agent, or Firm—Martin A. Farber

(57) ABSTRACT

A method of forming a film or a micro structure having high density and high strength by bonding brittle ultra fine particles without heating them. The brittle ultra fine particles blown to a substrate are applied with a mechanical impact force to break and bond them together.

19 Claims, 6 Drawing Sheets

TEM IMAGE IN CROSS SECTION OF INTERFACE BETWEEN ROOM TEMPERATURE DEPOSITED FILM AND SILICON SUBSTRATE

TEM IMAGE IN CROSS SECTION OF RAW MATERIAL PARTICLES

TEM IMAGE OF ROOM TEMPERATURE DEPOSITED FILM AND DIFFRACTION IMAGE

METHOD OF FORMING A SHAPED BODY OF BRITTLE ULTRA FINE PARTICLES WITH MECHANICAL IMPACT FORCE AND WITHOUT HEATING

BACKGROUND OF THE INVENTION

1. Field of the Invention

The present invention relates to techniques of forming a shaped body such as a film or a micro structure on a substrate by applying ultra fine particles of brittle material such as ceramics to the substrate.

2. Description of the Related Art

A method of forming a film or a micro structure on a substrate by using ultra fine particles of brittle material such as ceramics by mixing brittle ultra fine particles with carrier gas and blowing the gas toward a substrate via a fine nozzle has been proposed. In order to provide desired physical properties of the film or micro structure, it is essential that the ultra fine particles in the film or micro structure have a desired bonding strength.

In practice, however, whether ultra fine particles can be bonded and molded at high density and strength at room temperature without any thermal assistance depends on the physical properties of the ultra fine particles to be used, and the reason for this is still not clear. Therefore, in order to obtain sufficient physical properties (mechanical and electrical characteristics and the like) using a conventional molding (film forming) method, it is usually required to heat a substrate to a temperature of several hundreds of OC or higher and thereafter bake it at a high temperature near the sintering temperature of ceramics (brittle material). In general sintering techniques for ceramics, it is also essential to bake ceramic material at a high temperature (at least 900° C. or higher) in order to bond ultra fine particles by utilizing thermal diffusion phenomenon such as by a solid state reaction and a solid-liquid state reaction.

Since such heat treatment is necessary, it is impossible to apply ceramics directly to a substrate having a low heat resistance such as a plastic substrate, and also it is necessary to prepare a sintering furnace which makes the manufacturing process complicated. Such heat treatment may change the size precision or physical properties of a film or micro structure from that of before sintering.

A method of forming a film or a micro structure without any heat treatment, in which the film or micro structure has high density and strength and is made of brittle ultra fine particles bonded at a desired bonding strength, has long been desired.

SUMMARY OF THE INVENTION

It is an object of the invention to provide a method of forming a film or a micro structure without any heat treatment, which film or micro structure has high density and strength and other desired characteristics and which is made of brittle ultra fine particles bonded at a desired bonding strength.

In order to achieve the above-mentioned object, the invention provides a method of forming a brittle ultra fine particle shaped body at a low temperature, wherein a mechanical impact force is applied to brittle ultra fine particles supplied to a substrate to break the particles and bond them together.

BRIEF DESCRIPTION OF THE DRAWINGS

Embodiments of the invention will be described in detail with reference to the accompanying drawings, wherein.

DETAILED DESCRIPTION OF THE PREFERRED EMBODIMENTS

Figure 1:
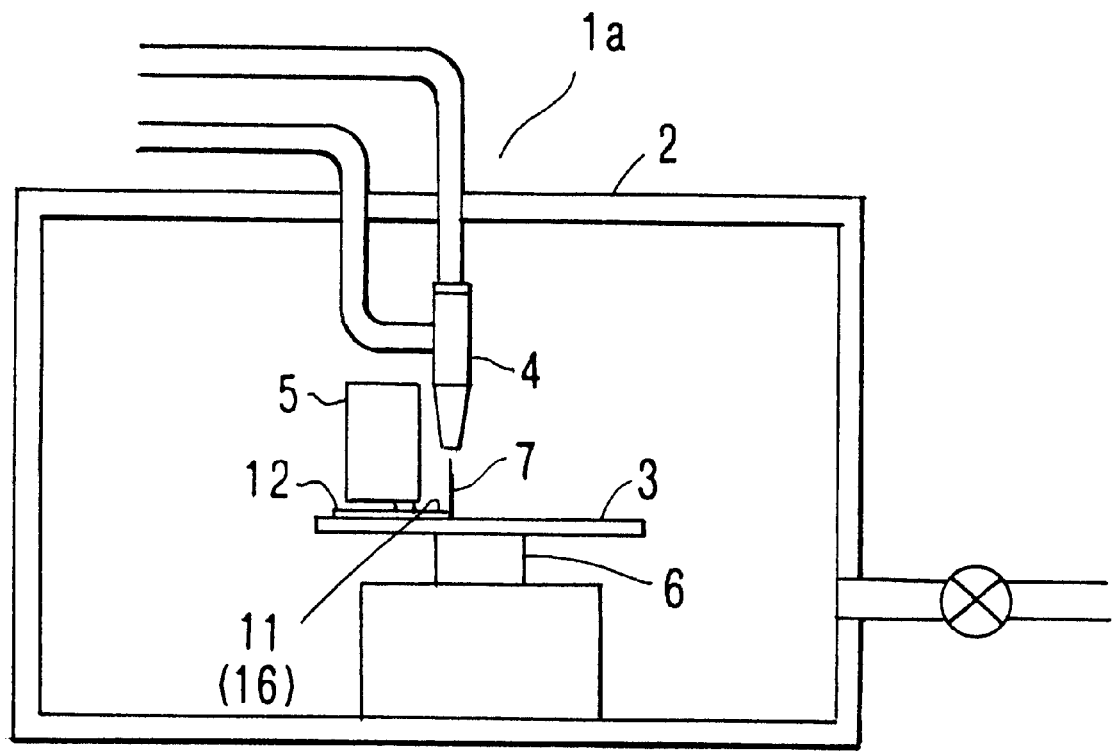
FIG. 1 is a schematic diagram showing the structure of an ultra fine particle film forming system.

Referring to FIG. 1, in a chamber 2 of an ultra fine particle film forming system 1a, a substrate 3 and an ultra fine particle supply apparatus 4 are mounted. In this embodiment, a nozzle is used as the ultra fine particle supply apparatus 4. A film is to be formed on this substrate 3. If necessary, a mechanical impact force loading apparatus 5 is disposed along a motion direction of the substrate 3.

The nozzle 4 is used for applying brittle ultra fine particles to the substrate 3 to form an ultra fine particle deposit 11 or an ultra fine particle pressed body 16. The ultra fine particle deposit 11 is a deposit of ultra fine particles on the substrate 3 supplied from the nozzle 4 and not bonded to each other. The ultra fine particle pressed body 16 is a body of ultra fine particles blown from the nozzle 4 and bonded together by a mechanical impact force caused by the blowing force of the nozzle 4. The substrate 3 is mounted on a substrate driver apparatus 6 so that it can be moved in the chamber 2 along the horizontal plane. The nozzle 4 may be made movable in the chamber 2 relative to the substrate 3.

The mechanical impact force loading apparatus 5 is used for applying a mechanical impact force to the ultra fine particle deposit 11 on the substrate to break the brittle ultra fine particles 7 and form an ultra fine particle film 12.

Next, the operation of forming a film will be described. Ultra fine particles 7 are mixed with carrier gas in the nozzle 4 and blown to the substrate 3 while the substrate 3 is moved relative to the nozzle 4 to form the ultra fine particle deposit 11. Alternatively, ultra fine particles 7 are collided with the substrate to break and bond them to form the ultra fine particle pressed body 16. If this ultra fine particle pressed body 16 has physical properties sufficient for a target ultra fine particle film 12, this pressed body 16 may be used as the final ultra fine particle film 12 to terminate the film forming process. If necessary, a mechanical impact force may be applied to the ultra fine particle pressed body 16 formed on the substrate to further break the ultra fine particles of the pressed body 16 to form an ultra fine particle film 12 having a greater bonding strength. An ultra fine particle film will not be formed unless a mechanical impact force is applied to the ultra fine particle deposit 11.

The mechanical impact force to be applied to the ultra fine particle deposit 11 or ultra fine particle pressed body 16 in order to break the ultra fine particles, may be realized: by accelerating brittle ultra fine particles by applying an electrostatic field; or by using a gas carrier to blow them to a substrate; or by using a high rigidity brush or roller rotating at high speed; or by pressure needles (stamping rods)

moving up and down; or by a piston moving at high speed utilizing explosion compression force; or by using ultrasonic waves. In this case, the carrier gas may be dry air without using a specific gas such as an inert gas.

It is necessary for ultra fine particles to be broken easily by the mechanical impact force generated either by the blowing force of the nozzle 4 or by the mechanical impact force loading apparatus 5. To this end, it is essential that the generated mechanical impact force becomes dominant over the brittle fracture strength of ultra fine particles. In order to satisfy this condition, the raw material of ultra fine particles are pre-processed: to adjust by changing the pre-sintering temperature of the brittle ultra fine particles; to form secondary cohesive particles of about several hundreds nm in diameter by heating brittle ultra fine particles of several tens nm or smaller in diameter which are formed by chemical methods such as alkoxide colloid, pyrolysis, or by physical methods such as using vapor deposition and sputtering; or to form particles with cracks by processing them for a long time with a smasher such as a ball mill, a jet mill, a beads mill and a vibration mill. By applying a mechanical impact force to such raw material of ultra fine particles, they can be broken to have a diameter of at least 100 nm or smaller so that a clean new surface can be formed and a low temperature bonding becomes possible. In this manner, brittle ultra fine particles can be bonded at room temperature and a film having high density and strength can be formed. According to experiments made by the inventor, it is considered that such breakage of ultra fine particles by the mechanical impact force is not likely to occur if the diameter of each brittle fine particle of raw material is 50 nm or smaller. If the mechanical impact force is generated by the blowing force of the nozzle, this mechanical impact force is not sufficient for impact breakage if the particle diameter is too large. It is therefore preferable that the particle diameter is set in a range of about 50 nm to 5 $\mu$m for each of the above-described methods of applying the mechanical impact force.

Films were formed by using brittle ultra fine particles of lead zirconate titanate oxide (PZT) or titanium dioxide ($TiO_2$) prepared in the above manner. Dense films having a theoretical density of 95% were able to be formed, and the adhesion force to a silicon or stainless substrate was 50 MPa or higher.

A process of forming a brittle ultra fine particle film will be described by using as an example a process of colliding brittle ultra fine particles mixed with carrier gas with a substrate to break the particles. The ultra fine particles collided with the substrate first anchor with the substrate (anchoring effect) to form an underlying layer. In this case, the ultra fine particles may be partially bonded depending upon a combination of the materials of the particles and the substrate. However, this partial bonding is not necessarily required but it is sufficient if the underlying layer has such an adhesion force that the layer is not peeled off while brittle ultra fine particles collide with it thereafter. Ultra fine particles colliding with the underlying layer break themselves and those particles on the surface of the underlying layer. These broken particles are bonded together at a low temperature to form a strong deposit. In this manner, while the collided brittle ultra fine particles are deposited over the substrate, breakage and bonding progress. The thickness of a film of brittle ultra fine particles to be formed on the substrate is determined based upon whether or not the breakage impact force can be maintained effective.

The method of applying the mechanical impact force includes in addition to a method of blowing brittle ultra fine particles from a nozzle toward a substrate, a method of using a brush or roller rotating at high speed or using thin stamping rods. In thinly depositing or spreading brittle ultra fine particles on a substrate, they may be pushed against the substrate by using the roller to press them without breakage, without necessarily using the nozzle. In some cases, they may be merely gently dropped down and deposited.

As a method of mechanically breaking brittle ultra fine particles, high intensity ultrasonic waves may be applied in a contact or non-contact manner. In this case, ultrasonic waves strong enough to break the particles are applied to a brittle ultra fine particle pressed body thinly developed on or mechanically pressed against a substrate to break the particles by the impact force induced in the pressed body by the ultrasonic waves. Although ultrasonic waves can be applied in a contact or non-contact manner, sound energy can be transmitted more efficiently if the ultrasound source is made in direct contact with the pressed body or via an impedance matching medium. The ultrasonic wave may spatially converge by using an ultrasonic lens to apply it to one point and break this point. With this method, only a particular point of the particle pressed body may be bonded at a low temperature. If an ultrasonic wave is directly applied to a press mold or roller for molding a particle pressed body, the mechanical impact force by ultrasonic waves can be generated by a simple process.

Figure 2:
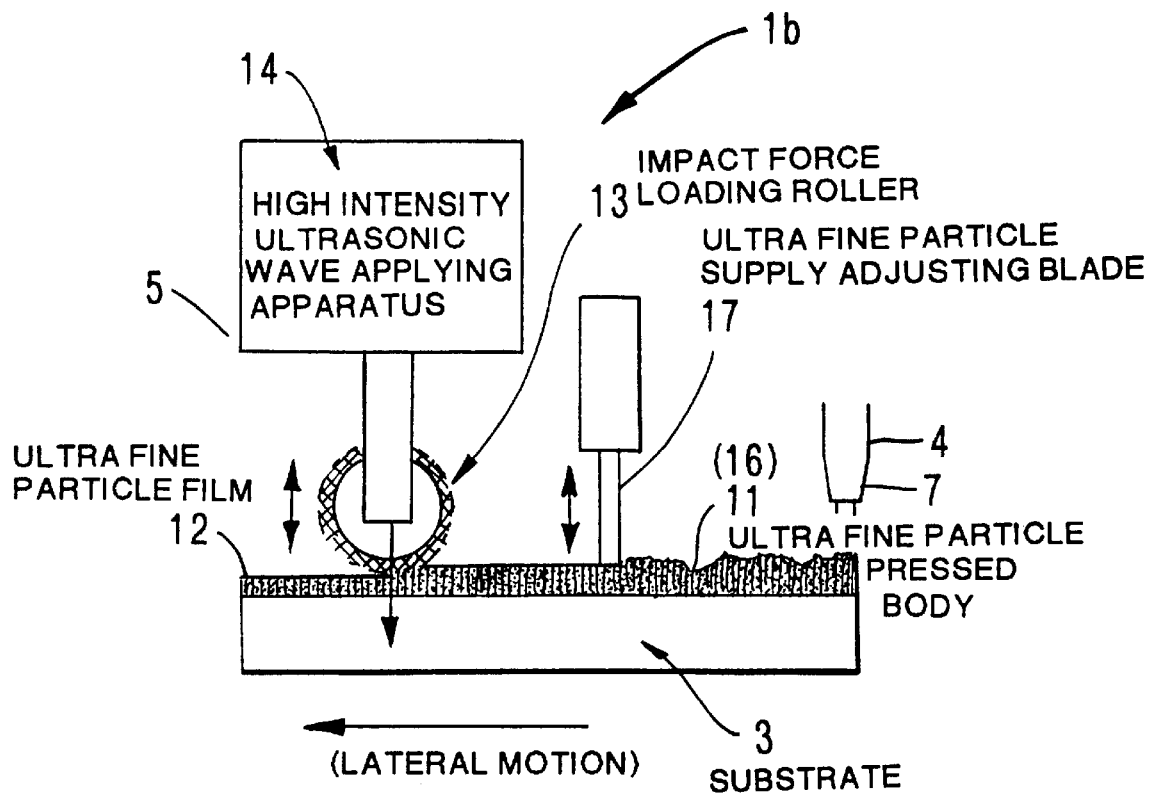
FIG. 2 is a schematic diagram showing the structure of another ultra fine particle film forming system.

An ultra fine particle film forming system 1b according to another embodiment shown in FIG. 2 has an ultra fine particle supply adjusting blade 17 and a mechanical impact force loading apparatus 5.

The ultra fine particle supply adjusting blade 17 adjusts the supply amount of brittle ultra fine particles 7 to a substrate 3 by scraping and planarizing the surface of an ultra fine particle deposit 11 or an ultra fine particle pressed body 16. The supply amount is controlled by adjusting the height of the blade 17.

The mechanical impact force loading apparatus 5 has, as shown in FIG. 2, an impact force loading roller 13 and a high intensity ultrasonic wave applying apparatus 14.

Figure 3:
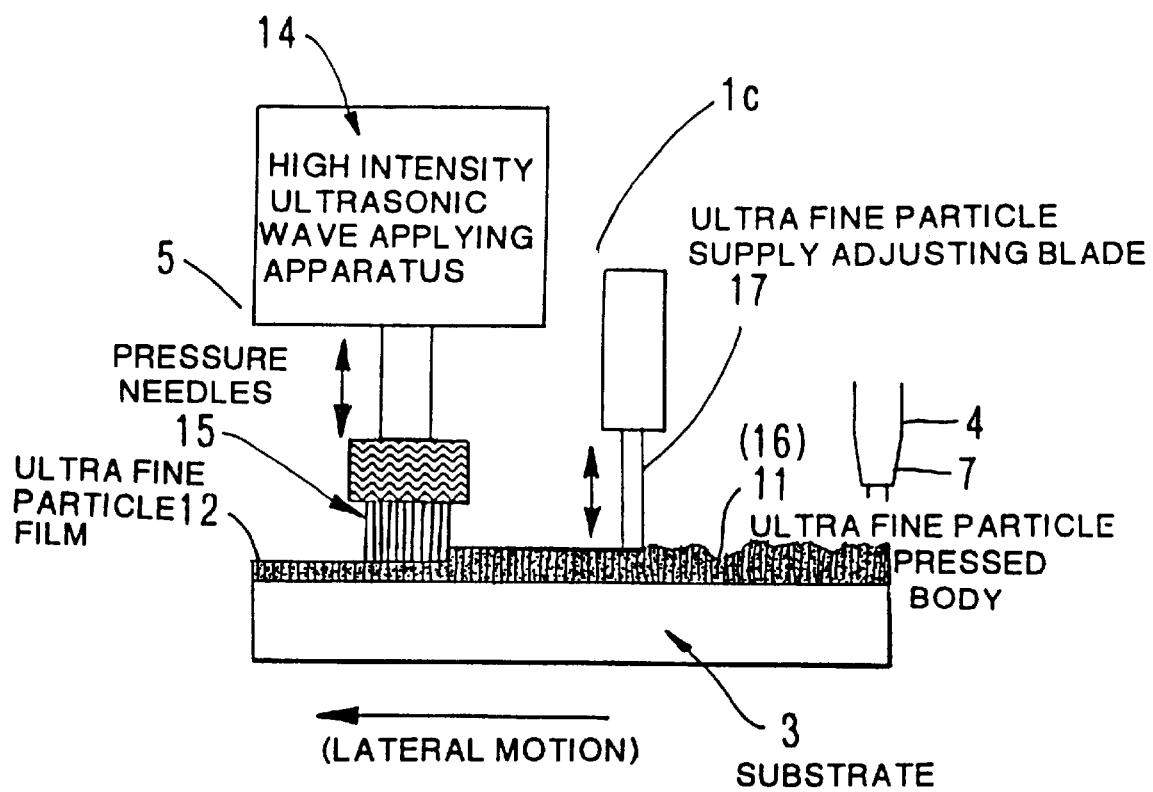
FIG. 3 is a schematic diagram showing the structure of another ultra fine particle film forming system.

The impact force loading roller 13 is used for forming an ultra fine particle film 12 by directly applying a mechanical impact force to the adjusted supply amount of the ultra fine particle deposit 11 on the substrate 3. The high intensity ultrasonic wave applying apparatus 14 drives the impact force loading roller 13. The impact force loading roller 13 may be any other body so long as it can load the mechanical impact force to the ultra fine particle deposit 11 or ultra fine particle pressed body 16. For example, in an ultra fine particle film forming apparatus of another embodiment shown in FIG. 3, a number of impact force loading stamping rods 15 are used. The embodiment of the invention described above may be applied not only to forming a dense film but also to a porous film, by adjusting raw material particles and film forming conditions such as film forming speed. A porous film is effective for applications requiring a large specific surface area, such as electrodes of a fuel battery and a super capacitor.

EXPERIMENTAL EXAMPLES (1) Introduction

For application of piezoelectric material to a micro actuator or the like, it is important to form a thick film of about 20 $\mu$m and then finely pattern it. Lead zirconate titanate oxide (PZT) of about 0.1 $\mu$m in diameter, typical piezoelectric material, was mixed with gas to make it aerosol and blow it via a nozzle to a substrate in the form of a high speed jet flow to form a film. This method is more advantageous in that a dense thick film can be formed in a dry process without a binder and fine patterns can be formed easily, as compared to a screen printing method. As different from general film forming techniques, it can be considered that the electrical characteristics of a film formed by this method are greatly influenced by the heat treatment conditions and the structural change in the ultra fine particles such as PZT particles to be formed when they collide with a substrate. The microscopic structure of films were investigated in order to clarify the film forming mechanism and improve the film characteristics.

(2) Experiment Method

PZT ultra fine particles were ejected from a nozzle having an opening size of 5 mm×0.3 mm and deposited on a substrate by using an aerosol gas deposition method. The substrate used included a silicon substrate, a SUS 304 substrate, and a PT/Ti/SiO$_2$/Si substrate. The PZT particles had a composition of Zr/Ti:52/48, a specific surface area of 2.8 m$^2$/g, and an average particle diameter of 0.3 μm, and were heated and dried in a low pressure of 10$^{-2}$ Torr. Carrier gas was He and dried high purity air, and the particle speed was controlled by the carrier gas flow rate. The microscopic structure of a PZT film having a thickness of 20 μm formed in the above manner was observed as TEM images and electron beam diffraction images.

(3) Results and Conclusions

Figure 4:
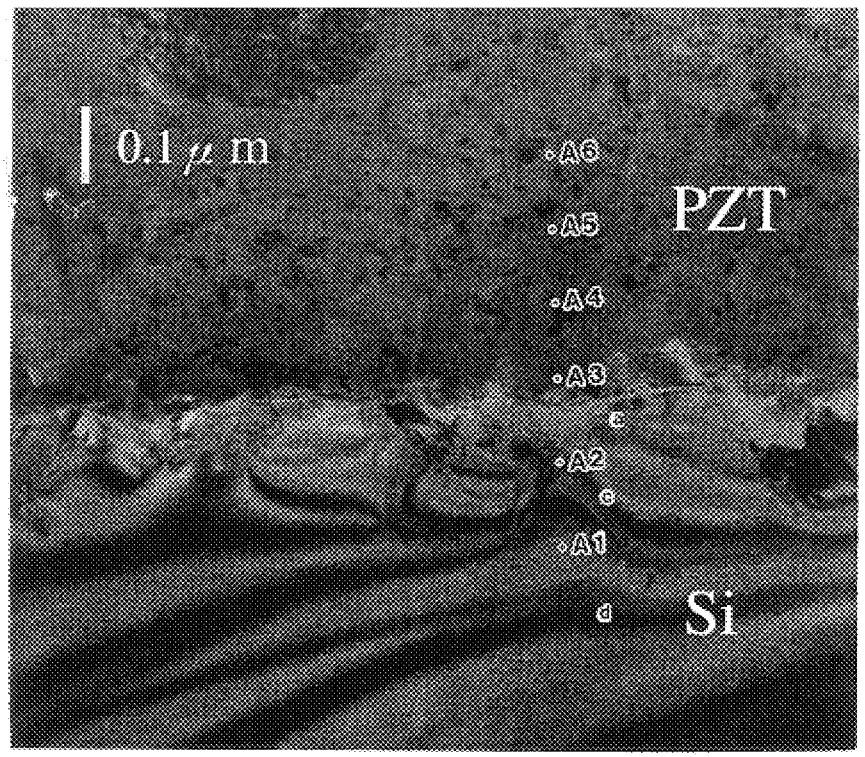
FIG. 4 is a TEM image showing the cross section of an interface between a film formed at room temperature and a silicon substrate.

FIG. 4 is a TEM image showing the cross section of a film formed on an Si substrate at room temperature. There is a damage layer of about 0.15 μm at an interface between the Si substrate and a PZT layer, the damage layer being formed through collision of the PZT ultra fine particles with the substrate. It can therefore be presumed that a mechanical impact force was generated by the collision of PZT ultra fine particles, the impact force exceeding the plastic flow pressure (Vickers hardness: 5 to 12 GPa) of Si. Since the brittle fracture strength of PZT ultra fine particles is 2.3 to 4 GPa, it can be expected that such a large mechanical impact force sufficiently broke PZT ultra fine particles and generated a new surface.

According to the composition analysis through EDX, thermal diffusion into the Si substrate was hardly recognized. Voids were hardly found in the film and at the interface, indicating that the dense film was formed at room temperature.

Figure 5:
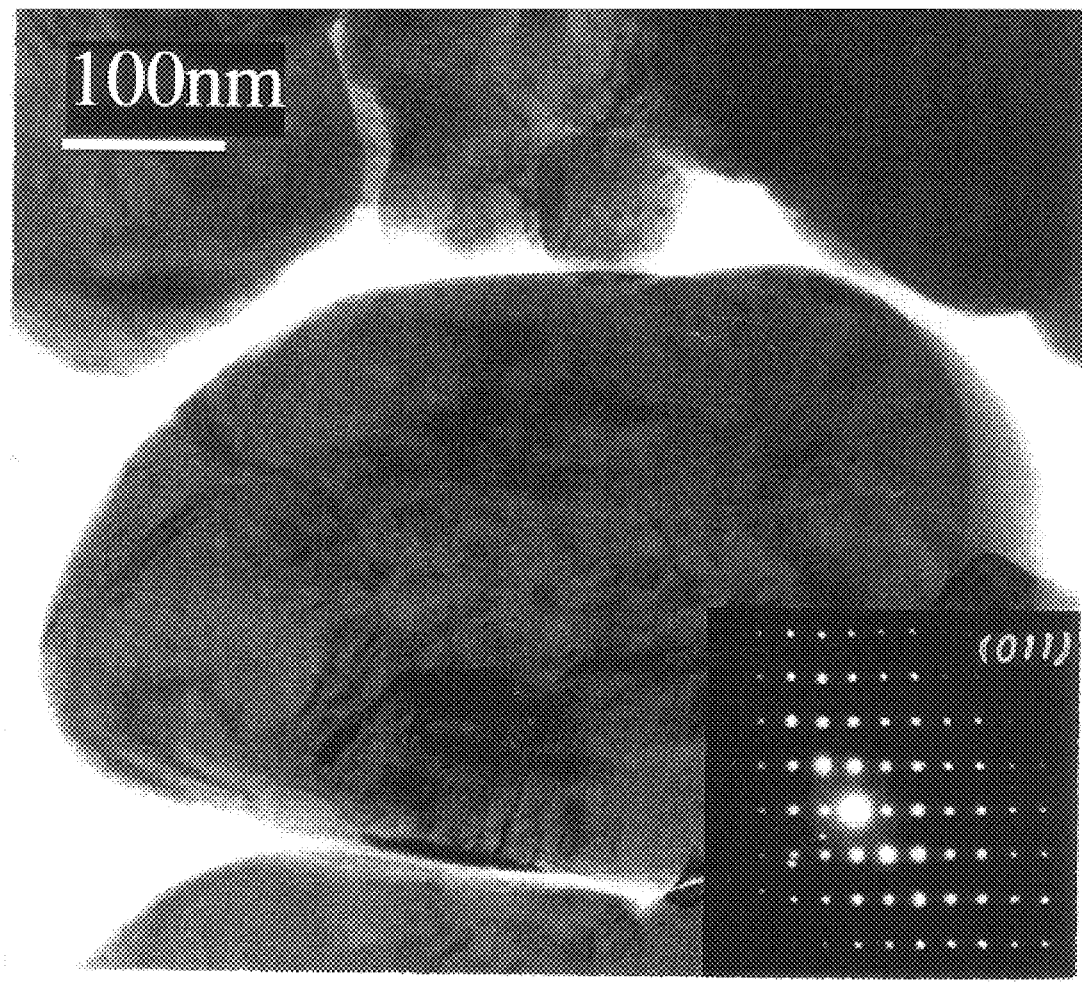
FIG. 5 is a TEM image showing the cross section of particles used as source material and its electron beam diffraction image.
Figure 6:
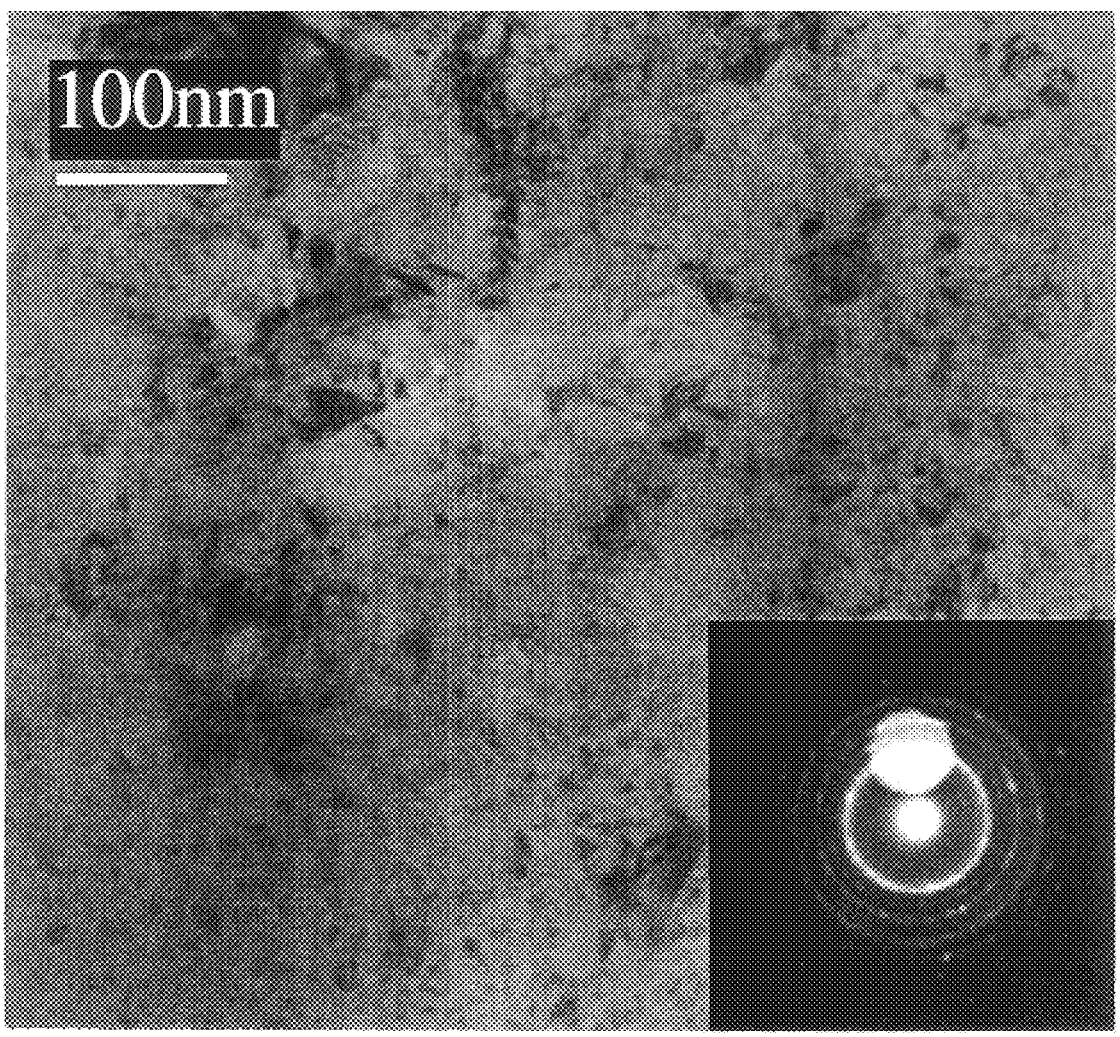
FIG. 6 is a TEM image showing the plan view of a film formed at room temperature and its electron beam diffraction image.

FIG. 5 is a TEM image in cross section of raw material particles, and FIG. 6 is a TEM image in plan view of a film deposited at room temperature on a Pt/Ti/SiO$_2$/Si substrate. Raw material particles were partially cohesive and had inner strain and defects. Particles were almost single crystals as determined from an electron beam diffraction image when considering the particle diameter near to that observed by TEM. The crystallite size was concentrated in a range of about 0.1 to 0.5 μm. In contrast, an as-deposited film at room temperature had a polycrystalline structure such that there was no significant change in the composition of the film both in the cross sectional direction and the in-plane direction, with large crystallite of about 0.1 to 0.2 μm approximately of the original size, being embedded and surrounded with small crystallite of about 10 to 40 nm, and also that a number of fine contrasts were observed which might be generated by strain. From these studies, it can be understood that some of PZT ultra fine particles of raw material are broken finely and form fine crystals of about several tens μm because of collision with the substrate during the film forming process.

As described above, according to the present invention, the mechanical strength (brittle fracture strength) of brittle ultra fine particles is adjusted in accordance with a mechanical impact force to be applied to the brittle ultra fine particles so that the impact breakage occurs, or the mechanical impact force is applied in accordance with the mechanical strength of the brittle ultra fine particles. In this manner, a clean new surface is formed and the brittle ultra fine particles are bonded together so that an ultra fine particle film having high density and high strength can be formed at room temperature. The new surface formed through breakage of the brittle ultra fine particles is again bonded in a very short time on site by the pressure applied to the brittle ultra fine particles. Since the time taken to bond the particles again is very short, the film forming atmosphere may be atmospheric air without using a specific atmosphere such as an inert gas atmosphere. As the size of the brittle ultra fine particles becomes about several tens nm, the surface energy increases to enhance bonding, and generation of voids can be prevented which are otherwise formed because of undefined shapes of the particles. A dense film or micro structure in the order of several tens nm in diameter can be obtained.

Since brittle material such as ceramics having a high melting point can be formed on a substrate at room temperature, the surface of a substrate made of material having a low melting point such as plastic can be coated with ceramics. A vinyl film was attached to a stainless steel substrate, and brittle ultra fine particles of PZT were blown to the surface of the vinyl film. It was possible to form at room temperature a very rigid shaped body having a density of 97% and an adhesion force of 15 MPa. Ceramic material having a nanometer size crystal structure was able to be formed finer than raw material ultra fine particles through breakage impact. The density of the shaped body was higher than the theoretical density of 95%. Therefore, the temperature of heat treatment for grain growth was able to be lowered. For example, in the case of lead zirconate titanate (PZT), the temperature was able to be lowered by about 300° C. as compared to a usual sintering temperature. A lowered grain growth temperature was thus confirmed.

As the brittle ultra fine particles broken into under 80 nanometer size have many fine new surfaces, the surface energy of the brittle ultra fine particles without heating increase to enhance bonding of them.

Therefore it is required that at least a part of the brittle ultra fine particles supplied to a substrate be broken into 80 nanometer or less size by applied mechanical impact force in the process of the present invention.

Further, by not heating the shaped ceramic body such as ceramic film having polycrystal structure with nanometer order crystallite size formed by the process of the present invention, the fine crystallite in the body does not grow and is kept in fine broken size and it brings improving elasticity and strength of the body and then it brings improved characteristics of toughness.

As apparent from the above description of the invention, brittle ultra fine particles such as ceramics are broken into particles of about several tens nm by applying a mechanical impact force. A clean new surface can be formed on site, and by utilizing this surface, ultra fine particles are bonded together. In this manner, a shaped body such as a film and a micro structure of high density and high strength can be formed without heating.

What is claimed is:

1. A method of forming a brittle ultra fine particle shaped body having a density which is higher than a theoretical density of 95% without application of heat, comprising steps of:

preprocessing brittle ultra fine particles to allow for a further fracturing of processed ultra fine particles in a subsequent step of applying an impact force to preprocessed particles which have been applied to a substrate;

wherein, in the preprocessing step, there is a changing of a sintering temperature characteristic of the particle material, or a forming of cohesive secondary particles of approximately 50 nm to 5 microns in diameter by a heating of the ultra fine particles, or a production of cracks in the ultra fine particles by a milling of the particles;

applying the brittle preprocessed ultra fine particles to the substrate; and applying a mechanical impact force to the preprocessed brittle ultra fine particles to break the ultra fine particles into smaller particles having a diameter of less than 100 nm, to produce clean new surfaces on the smaller particles, and to bond together the smaller particles to each other and to the substrate to form the shaped body;

wherein said impact force is greater than the brittle fracture strength of the processed ultra fine particles.

2. A method of forming a brittle ultra fine particle shaped body without application of heat, according to claim 1, further comprising producing the mechanical impact force applied to the ultra fine particles applied to the substrate by accelerating the brittle ultra fine particles by applying an electrostatic field, by using a gas carrier to blow the particles to the substrate, by applying a rigid brush or roller, by applying moving stamping rods up and down, by applying a piston having a compression force caused by an explosion, or by applying ultrasonic waves.

3. A method of forming a brittle ultra fine particle shaped body without application of heat, according to claim 1, wherein at least some of the preprocessed ultra fine particles applied to the substrate are broken by applied mechanical impact force into a size of 80 nanometers or smaller.

4. A method of forming a brittle ultra fine particle shaped body without application of heat, according to claim 1, wherein the milling is accomplished in a ball mail or a jet mail.

5. A method of forming a brittle ultra fine particle shaped body without application of heat, according to claim 1, wherein the mechanical impact force applied to the preprocessed brittle ultra fine particles applied to the substrate is produced by accelerating the preprocessed brittle ultra fine particles in an electrostatic field.

6. A method of forming a brittle ultra fine particle shaped body without application of heat, according to claim 1, wherein the mechanical impact force applied to the preprocessed brittle ultra fine particles applied to the substrate is produced by using a gas carrier to blow the particles to the substrate.

7. A method of forming a brittle ultra fine particle shaped body without application of heat, according to claim 1, wherein the mechanical impact force applied to the preprocessed ultra fine particles applied to the substrate is produced by using a rigid brush or a rotating roller after the preprocessed particles are applied to the substrate.

8. A method of forming a brittle ultra fine particle shaped body without application of heat, according to claim 1, wherein the mechanical impact force applied to the preprocessed ultra fine particles applied to the substrate is produced by moving stamping rods up and down after the preprocessed particles are applied to the substrate.

9. A method of forming a brittle ultra fine particle shaped body without application of heat, according to claim 1, wherein the mechanical impact force applied to the preprocessed ultra fine particles applied to the substrate is produced by a piston having a compression force caused by explosion after the preprocessed particles are applied to the substrate.

10. A method of forming a brittle ultra fine particle shaped body without application of heat, according to claim 1, wherein the mechanical impact force applied to the preprocessed ultra fine particles applied to the substrate is produced by using ultrasonic waves after the preprocessed particles are applied to the substrate.

11. A method of forming a brittle ultra fine particle shaped body without application of heat, according to claim 1, wherein, in the heating of the preprocessing step, the brittle fracture strength of said pre-processed ultra fine particles is reduced by heating at a temperature lower than a sintering temperature of the brittle ultra fine particles.

12. A method of forming a brittle ultra fine particle shaped body without application of heat, according to claim 1, wherein the brittle ultra fine particles are ceramic.

13. A method of forming a brittle ultra fine particle shaped body without application of heat, according to claim 1, wherein said steps of applying the particles to the substrate, applying the mechanical impact force, and bonding are performed in atmospheric air.

14. A method of forming a brittle ultra fine particle shaped body without application of heat, according to claim 1, wherein the shaped body is formed of the secondary particles having the size in the range from approximately 50 nanometers to 5 micrometers.

15. A method of forming a brittle ultra fine particle shaped body according to claim 1, wherein crystallite size of the processed ultra fine particles of the shaped body is in a range from approximately 50 nanometers to 5 micrometers.

16. A method of forming a brittle ultra fine particle shaped body without application of heat, comprising the steps of:

depositing the brittle ultra fine particles on a substrate;

applying a mechanical impact force to the brittle ultra fine particles so as to break said particles and cause the particles to have active bonding sites;

wherein the particles have a particle size in a range from approximately 50 nanometers to 5 microns to facilitate the breaking of the particles in response to the mechanical impact force to accomplish a bonding to each other and to the substrate as a result of the applied mechanical impact force, so as to produce the shaped body in the form of a film or a micro structure of the brittle ultra fine particles; and said mechanical impact force is produced by one of the group consisting of a rigid brush, or a rotating roller, stamping rods moving up and down, and ultrasonic waves.

17. A method of forming a brittle ultra fine particle shaped body without application of heat, according to claim 16, further comprising a step of preprocessing prior to said depositing step, wherein said preprocessing is a heating or a milling of the ultra fine particles, the heating being at a temperature lower than a sintering temperature to reduce a brittle fracture strength of the ultra fine particles, the heating of the particles producing secondary particles of approximately 50 nm to 5 microns in diameter, and wherein the milling of the ultra fine particles produces cracks in the ultra fine particles.

18. A method of forming a brittle ultra fine particle shaped body without application of heat, according to claim 16, wherein at least some of the particles deposited on the substrate are reduced in size to a size of 80 nanometers or smaller by said mechanical impact force.

19. A method of forming a brittle ultra fine particle shaped body of which density is higher than a theoretical density of 95% without application of heat, comprising the steps of applying a mechanical impact force to brittle ultra fine particles applied to a substrate to break the particles into smaller broken particles with formation of clean new surfaces on the broken particles, and causing a bonding together of the smaller particles to each other and to the substrate, the method further comprising the step of subjecting the brittle ultra fine particles to a pre-processing step prior to the applying of the ultra fine particles to the substrate such that the mechanical impact force applied to the brittle ultra fine particles causes fracturing of the brittle ultra fine particles.

\* \* \* \* \*